United States Patent [19]

Shaw

[11] 4,452,288
[45] Jun. 5, 1984

[54] POWERED TREE CHIPPER OR BARK HACK

[75] Inventor: Lawrance N. Shaw, Gainesville, Fla.

[73] Assignee: The United States of America as represented by the Secretary of Agriculture, Washington, D.C.

[21] Appl. No.: 351,400

[22] Filed: Feb. 23, 1982

[51] Int. Cl.³ .............................................. B27L 1/00
[52] U.S. Cl. .................................. 144/208 C; 30/169; 30/241; 144/340; 299/37
[58] Field of Search .............. 144/208 C, 340; 30/121, 30/180, 169, 241, 121; 299/37

[56] References Cited

U.S. PATENT DOCUMENTS

| | | | |
|---|---|---|---|
| 2,503,539 | 4/1950 | Aspeek | 30/169 |
| 2,722,072 | 11/1955 | Aspeek | 30/169 |
| 3,235,963 | 2/1966 | Hall | 30/241 |
| 3,340,610 | 9/1967 | Henrickson | 30/241 |
| 3,988,829 | 11/1976 | Sumida | 30/241 |
| 4,158,913 | 6/1979 | Barson | 30/241 |
| 4,286,383 | 9/1981 | Farden | 30/169 |

FOREIGN PATENT DOCUMENTS

| | | | |
|---|---|---|---|
| 1399667 | 4/1965 | France | 144/208 C |
| 1013477 | 12/1965 | United Kingdom | 30/121 |

Primary Examiner—W. D. Bray
Attorney, Agent, or Firm—M. Howard Silverstein; David G. McConnell

[57] ABSTRACT

An improved power bark hack including a motor of any suitable type which drives one end of an elongated connecting rod mounted in a co-extensive housing which also serves as the tool handle. The cutter is mounted at the free end of the connecting rod which extends out from the handle or housing. Bearing means, such as buttons made of Teflon which are easily replaced in use, are mounted in the end of the housing closely adjacent the end of the connecting rod carrying the cutting tool, whereby the rotary motion imparted by the motor to the drive end of the connecting rod is changed to substantially pure reciprocatory motion at the cutter blade end.

28 Claims, 16 Drawing Figures

4,452,288

POWERED TREE CHIPPER OR BARK HACK

FIELD OF THE INVENTION

The invention relates to a power bark hack provided with a blade for removing tree bark in diagonal strips.

BACKGROUND OF THE INVENTION

Manual bark hacks have been developed and used for over two centuries to remove diagonal strips or streaks of bark from pine trees so that gum resin naval stores can be collected from the trees. The resin collected can be chemically processed to manufacture many useful compositions such as turpentine, pine oil, tar pitch, asphalt and other similar materials, which were formerly and are still used by shipbuilders and in many other industries.

However, forest workers to do this bark removal work are presently in short supply and it has therefore become obvious that if the gum naval stores industry is to survive in the United States, the tedious and hard work of streaking pine trees must be made easier and more productive. It has therefore become apparent that a power operated bark hack would both speed up the streaking operation and increase worker productivity.

It has also become desirable to overcome the problem of fixed orientation of the chipper blade in manually operated bark hacks so that the tool could more easily be used by left-handed or right-handed workers or in an over-handed or under-handed position when needed.

Responsive to the above problems in the art, electrical and pneumatic hacks have been proposed and a pneumatic hack has been developed, but none of these power operated bark hacks has proved to be entirely satisfactory in operation.

OBJECTS AND SUMMARY OF THE INVENTION

An object of the invention therefore is to provide a power operated bark hack which is light in weight simple in design and relatively quiet in operation.

Another object is to provide such a bark hack which is safe to operate and capable of removing the tree bark without pulverizing it.

Still another object of the invention is to provide a bark hack which is powered by an off-the-shelf small engine or motor and which also includes means for transforming the rotary motion of the motor or engine into mostly reciprocatory motion of the chipper blade at a 1:1 ratio so that a speed change drive, such as a gear box, is not necessary for the operation of the tool.

Another object is to provide a bark hack which is driven by any such conventional power source, hydraulically or pneumatically, or by an electric motor or gasoline powered engine.

Yet another object is to provide a tool in which there is basically one moving part, and a minimum of parts in total which wear out in operation and have to be replaced.

Still another object is to develop a tool wherein the wear is concentrated on bearing means in the form of a set of guide buttons, and these buttons, when worn out, are disposable and removed very simply and easily and replaced.

Another object is to provide a bark hack having versatility in the orientation of the chipper blade with respect to the handle of the tool so that a simple adjustment permits orientation of the blade for left, right or over or under handed operation.

Still another object is to provide a tool of the character described having one basic moving part (connecting rod), which is light in weight, strong and durable, and yet highly practical and well suited for commercial use.

With the above objects in mind, a hydraulically powered bark hack, having a reciprocating chipper blade, has been developed according to the teachings of this invention. Although the tool could be electrically or pneumatically powered, hydraulic power is preferred at present because it is quiet, free from electrical shock and easily and conveniently supplied from a portable power unit. A simple connecting rod is used with the bark cutting blade mounted on the outer end of the reciprocating connecting rod. This mechanism provides a reciprocating motion that removes tree bark in long strips similar to the operation of conventional manual hacks.

The invention provides a greatly simplified motion transfer means from rotation at the driving end of the connecting rod to reciprocation at the cutter blade working end.

At the end of the connecting rod, close to the socket of the chipper blade cutter tool, are the bearing means in the form of four Teflon buttons slippers, each mounted in one of four planes each of which planes is at 90° with respect to the adjacent planes. These bearings or buttons function to absorb most of the transverse component of the connecting rod driving motion and permit transformation at the cutter working end of the connecting rod into substantially axial reciprocatory motion only. When these buttons become worn, the tool may easily be disassembled for quick replacement of the worn buttons with new buttons. These buttons themselves are small, simple and of relatively low cost. The slight amount of rocking or pitching nonreciprocating motion which appears at the blade aids in bark removal.

Moreover, the reciprocatory speed of the cutter blade can easily be adjusted within the range of 2000–5000 strokes per minute by changing the motor shaft rotational speed correspondingly within the range of 2000–5000 rpm. A 1:1 ratio is provided in designing the tool drive for transforming the rotational speed of the motor shaft into a axial component of that speed at the cutter blade end of the connecting rod.

Additionally, the length of the connecting rod and its housing, which housing also serves as the handle of the tool, may selectively be varied to more conveniently "tailor" the tool to suit persons of different body statures and strengths.

BRIEF DESCRIPTION OF THE DRAWINGS

The description of the invention which follows will be more easily understood when read in conjunction with the following figures of the drawing, wherein.

DETAILED OF PREFERRED EMBODIMENTS

Figure 1:
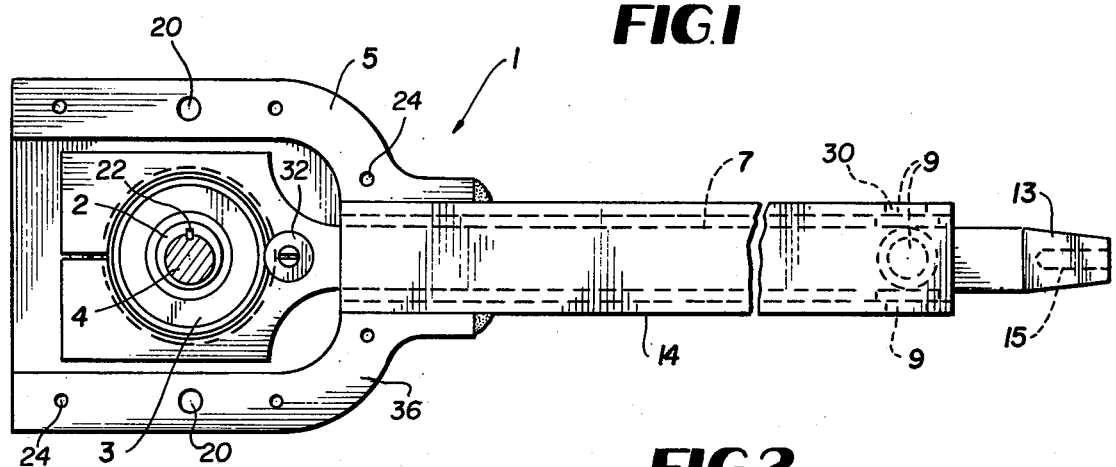
FIG. 1 is a plan view of the bark hack of the invention with the cutter removed.

In FIG. 1 an overall plan view of the power driven bark hack 1 of the invention is shown, in which connecting rod 7 and its housing 14 are shown to be of variable length so that the tool can be made in sizes to suit the operator; for example they can be made in shorter lengths for young boys or female operators or in longer lengths to suit the convenience of larger people such as husky male operators. The construction of this power tool is mostly of aluminum alloy to reduce its weight to about 3400 grams or 7 lb. and 8½ oz. (2020 gr or 416.8½ oz w/o motor), which is approximately the weight of the conventional hand-operated tool, i.e. the manual bark hack.

Since housing 14 is also the tool handle, a boot, cover, wrapping or the like, not shown, can be provided to make the tool more comfortable to heft and manipulate.

Figure 2:
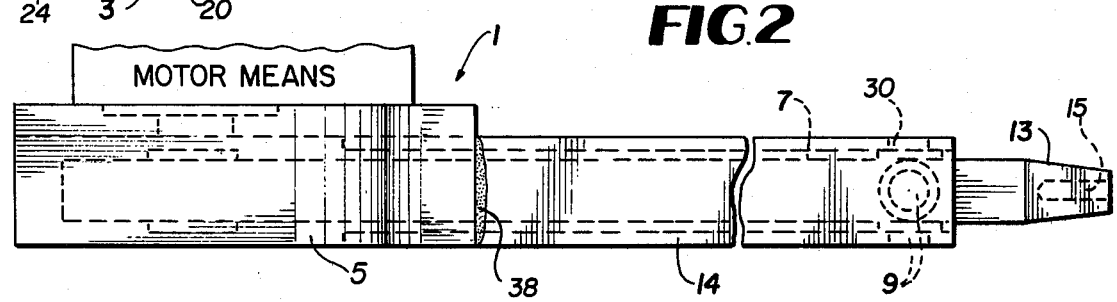
FIG. 2 is a side elevational view of the bark hack as shown in FIG. 1.
Figure 3:
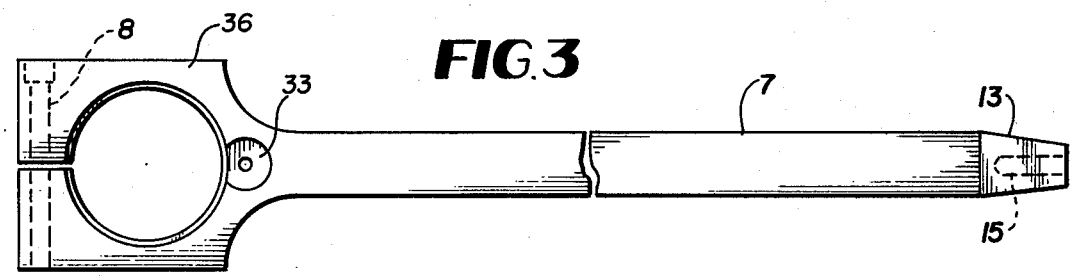
FIG. 3 is a plan view of the connecting rod of the bark hack of the invention.
Figure 4:
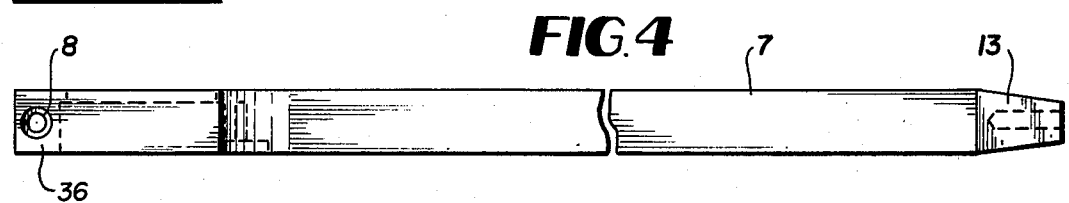
FIG. 4 is a side view of the connecting rod of FIG. 3.
Figure 9:
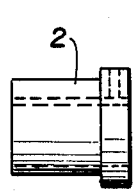
FIG. 9 is a side view of the eccentric drive bushing which is attached to the motor shaft of the bark hack of the invention.
Figure 10:
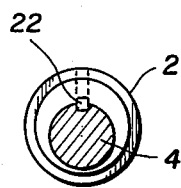
FIG. 10 is a front view of the eccentric bushing of FIG. 9.
Figure 12:
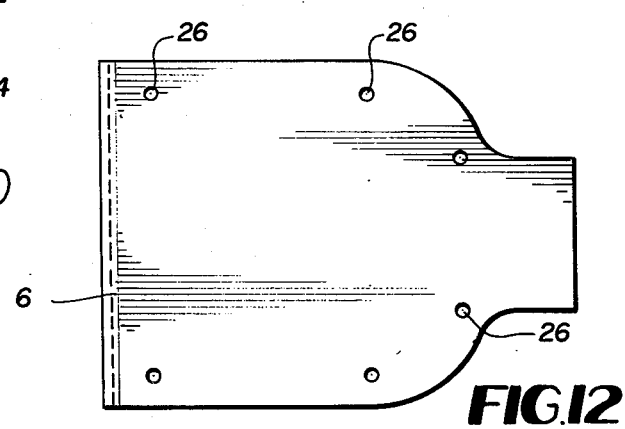
FIG. 12 is a plan view of the crankcase cover of the apparatus of the invention.
Figure 11:
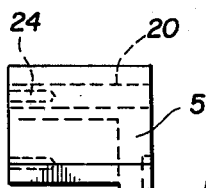
FIG. 11 is a right end elevational view of the crankcase of FIG. 7.
Figure 13:
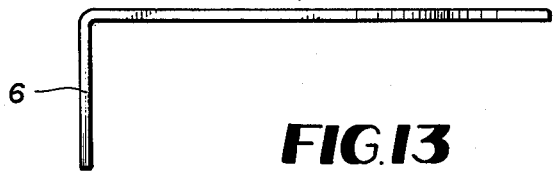
FIG. 13 is a side view of the crankcase ocver of FIG. 12.

A hydraulic motor, not shown, which has a displacement of 4.76 cubic cm. (0.290 cubic inches), a minimum speed of 2000 rpm; a maximum speed of 5000 rpm, and a relatively light weight, i.e. about 1.75 kg (3.8 lb) is bolted to the crankcase housing 5, at the holes 20 shown, top of FIG. 2, FIGS 7, 8, and 11, and the left hand end of FIG. 1. An eccentric drive bushing 2 (FIGS. 9 and 10) is used in place of a crankshaft and is attached to the motor shaft 4 (shown in FIG. 10) by a suitable key 22. The bushing turns inside a conventional sealed ball bearing 3, (see FIG. 1). The bearing 3 is clamped inside the connecting rod by a suitable securing means, such as a bolt, not shown, inserted in registering holes 8 of the connecting rod. The bearing 3 is also held in place by a screw and washer arrangement 32 that fits in mating opening 33 formed in the drive end 36 of the connecting rod 7. The eccentric bushing is designed to produce a 0.318 cm (⅛ inch) reciprocating cutter stroke length. The preferred operating speed of the motor may be varied within the range 2500 to 2600 strokes per minute which corresponds to a 1:1 ratio with the number of rotations per minute of the motor or engine shaft. Thus, the drive of the invention does not require a gear train, or any other transmission, to change the speed of rotation which is transmitted from the motor shaft to the connecting rod 7 and is transferred into a substantially pure reciprocatory motion of the cutter blade. The connecting rod 7, shown in FIGS. 3 and 4, is made of aluminum and is enclosed in an aluminum alloy connecting rod housing 14 (shown in FIGS. 1 and 16). The housing 14 serves as the tool's handle and is likewise made of an aluminum alloy and is integrally attached as a one-piece weldment to the crankcase 5, see weld 38 in FIG. 2. A crankcase cover 6 (shown in FIGS. 12 and 13) is attached with screws, not shown, to mating holes 24 and 26 in the crankcase 5 and cover 6 respectively, and encloses the entire drive system.

Figure 5:
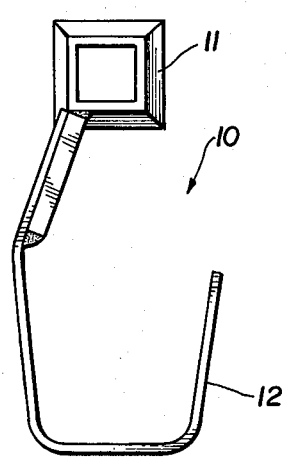
FIG. 5 is a rear view of the cutter blade looking from the right side of FIG. 6.
Figure 6:
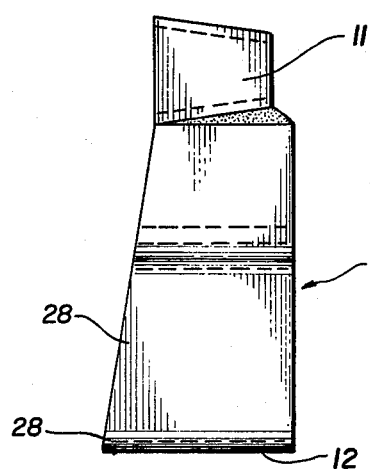
FIG. 6 is a side view of a removable cutter blade of the bark hack of the invention.
Figure 7:
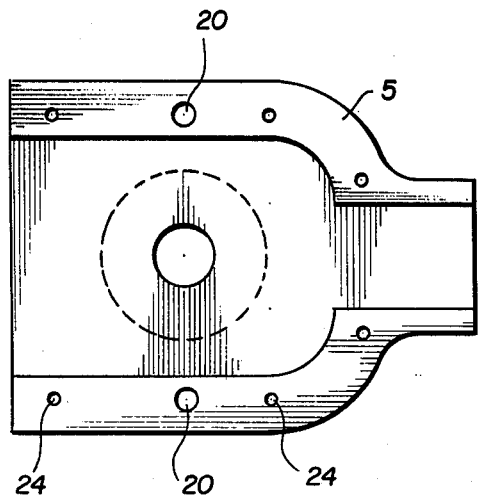
FIG. 7 is a plan view of the crankcase of the bark hack of the invention.
Figure 8:
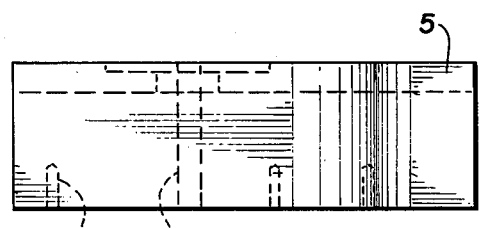
FIG. 8 is a side view of the crankcase of FIG. 7.

In FIGS. 5 and 6 an insertable cutter head 10 is shown which was made utilizing a blade, such as is used in a manual hack, connected to a tapered symmetrical socket of a truncated pyramid 11 which was welded to the cutter-blade in place of the tang in the manual tool. The end 13 of the connecting rod is tapered into a four-sided truncated pyramid, so that the cutter head socket can be attached, using the threaded hole 15 in the end 13 and suitable securing means such as a bolt and washer not shown, in any one of four right angle positions to suit the operator. This symmetrical socket 11 of cutter head 10 provides versatility as to orientation of the cutter edge or blade 12 with respect to the connecting rod so that left-handed, right-handed, over- or underhanded operation of the tool and cutter is possible, as desired by any particular operator in any particular bark streaking operation. This versatility is not available in the prior art manual tool. However, as is clear from FIGS. 4, 5 and 6, the invention tool cuts by being pulled rather than by being pushed. That is, the cutting edge 28 of blade 12 is on the left side of FIG. 6 as described below (FIG. 5 shown on the right hand side is plain), and socket 11 fits on end 13 on the right end of FIGS. 3 and 4. Therefore the cutting edge of blade 12 will face left and the operator grasping handle 7 must pull the blade 12 towards himself to streak bark.

Figure 14:
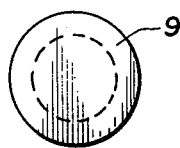
FIG. 14 is a front view of one of the connecting rod plastic bearing buttons of the invention.
Figure 15:
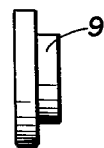
FIG. 15 is a side view of the connecting rod button of FIG. 14.

As shown in FIG. 1, the outer or cutter end of the connecting rod slides on bearing means in the form of four Teflon button slippers 9 (FIGS. 14 and 15) that are retained in recesses in the handle 14 by the rod 7. Even though the motor end of the connecting rod travels in a circular path, the cutter end or blade 12 of the connecting rod travels in an essentially reciprocating motion because of the short distance from the four Teflon button contact points to the cutter blade relative to the much longer distance from the button contact points to the motor end. This design is an important feature of the invention herein since a pivoted connection at the reciprocating end of the connecting rod is not necessary and thus the design of the unit is greatly simplified. That is, looked at another way, the buttons 9, in effect absorb most of the transverse component of the rotary drive motion and permit the motor or other power source to drive the cutter 12 in an essentially pure reciprocatory motion. The slight amount of non-reciprocating motion resulting from the conversion performed by the buttons 9 does not detract from the cutting efficiency of the tool.

The cutter blade is sharpened on three sides (see FIG. 6 lower left corner) to form a cutting edge 28 on these three sides, and thus in operation cuts the bark on any one or two of these three sides.

Off-the shelf motors or engines such as power tool motors, hydraulic or electrical motors, small gasoline chain saw, lawn mower or outboard motor boat engines, can all be used to power the drive of the power bark hack of the invention, as disclosed herein.

The bark hack disclosed herein is of further simplified design since it includes only one moving part other than the eccentric bushing and sealed ball bearing which are attached to the rotating motor shaft. Thus the single essential moving part of the tool drive is the connecting rod 7. Moreover, there is only one part of the device, namely the bearing means in the form of the Teflon buttons, which may experience relatively quick wear in operation. Since these buttons a function to transform rotation of the shaft at the driving left end of the connecting rod into mostly reciprocating motion at the tool and the working cutter right end of the device (see FIGS. 1 and 2), occasional replacement of these buttons a may be necessary. However, these Teflon buttons when worn out are easily and simply replaced by the following sequential procedure:

1. The cutter head 10 is first removed by simply removing the screw from hole 15;
2. The crankcase cover 6 is next removed;
3. The motor is then removed;
4. The connecting rod 7 is slid out at the left end through the now open crankcase 5;
5. The old worn Teflon buttons 9 ar manually removed and new buttons are installed in the holes 30 at the right end of the connecting rod housing;
6. Finally, all the parts of the tool are reassembled in the reverse order of that set forth above (5, 4, 3, 2, 1).

This provides the advantage of easy replacability of the worn Teflon buttons, as has been mentioned above.

The final weight of the hydraulically powered bark hack of the invention is about 3.4 kg or 7 lbs, 8½ oz., a little more than the weight of a manual hack, as mentioned supra.

Figure 16:
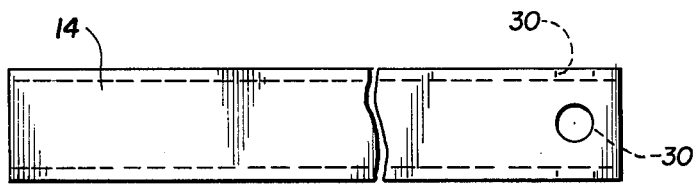
FIG. 16 is a side view of the connecting rod housing and handle of FIGS. 1 and 2.

The part 14 of the housing which is the handle and also serves as a cover for the connecting rod is shown in FIG. 16.

There are many commercial possibilities for the invention which as been described above. Presently there are 400-500 gum producers in the Southeastern United States, and there were about 80,000 barrels of gum produced in the 1977-78 crop year. With the price increasing since that time the production has increased but not many young workers are taking up gum collection. Mechanization would make this work more attractive. The invention will help fill this need by increasing production and decreasing the labor required.

The foregoing description of the specific embodiments will so fully reveal the general nature of the invention that others of ordinary skill in the art can by applying current knowledge, readily modify and/or adapt for various applications such specific embodiments without departing from the generic concept. Therefore, such adaptations and modifications should and are intended to be covered within the meaning and range of equivalents of the disclosed embodiments and the scope of the claims. It is understood that the phraseology or terminology employed herein is used for the purpose of description and not limitation.

I claim:

1. A cutting tool for use with a motor means having a rotary power shaft, said tool comprising a reciprocatory motion cutter means, and an elongated connecting rod, means to mount said cutter means at one end of said connecting rod, means to drivingly engage the other end of said connecting rod with said rotary power shaft, slider bearing means slidingly supporting said other end of said connecting rod closely adjacent said cutter means; whereby the rotary motion imparted to said connecting rod at said motor means end is transformed into substantially pure reciprocatory motion of said cutter means; said slider bearing means comprising the sole bearing support of said connecting rod carrying said cutter means, and said connecting rod with said cutter means mounted thereon comprising the sole moving part of said cutting tool driven by said rotary power shaft.

2. The combination of claim 1, wherein said drive engagement between said rotary power shaft and said other end of said comprises an eccentric drive bushing and a sealed bearing.

3. The combination of claim 1, wherein said drive engaging means transforms the rotational speed of said power shaft into a stroke speed of said cutter means at a 1:1 ratio.

4. The combination of claim 3, wherein said motor means rotates and the cutter means strokes at a speed in the range of about 2000 to about 5000 revolutions and strokes per minute, respectively.

5. The combination of claim 4, wherein said rotation speed and said stroke speed is in the range of 2500 to 2600.

6. The combination of claim 1, said tool further comprising housing means overlaying portions of said connecting rod, and means to mount said slider bearing means in said housing means.

7. The combination of claim 6, wherein said connecting rod and said connecting rod housing are of similar nested rectilinear cross-sectional shapes.

8. The combination of claim 6, wherein said slider bearing means comprise a plurality of Teflon buttons fitted into retaining openings formed in the juxtapositioned portion of said housing means, whereby said buttons are held in their openings by the sliding bearing contact of said buttons with said connecting rod.

9. The combination of claim 6, wherein said slider bearing means comprise four Teflon buttons fitted in retaining openings formed one in each of the four walls of nested rectilinear juxtapositioned portions of said connecting rod housing, whereby said buttons are held in their openings by the sliding contact of said buttons with said crankshaft.

10. The combination of claim 1, wherein said cutter means comprises a mounting portion and an offset cutting edge portion, said mounting portion of said connecting rod being of square cross-sectional shape in all planes normal to the axis of said connecting rod, said mounting portion of said connecting rod being of a four-sided truncated pyramid shape, and said mounting portion of said cutter means being of mating shape to the shape of the mounting portion of said connecting rod, whereby said cutter means may be mounted on said connecting rod mounting portion in any one of four 90° offset positions around the axis of said connecting rod.

11. The combination of claim 10, wherein said cutter means is of "U" shaped cross-sectional shape and is sharpened on all three of its edges on one side thereof.

12. The combination of claim 1, wherein said motor means is a hydraulic motor.

13. The combination of claim 1, wherein said motor means comprises an electric motor.

14. The combination of claim 1, wherein the motor means is a pneumatic motor.

15. The combination of claim 1, wherein said motor means is a self-contained gasoline or the like powered engine.

16. The combination of claim 6, wherein said connecting rod housing portion extends over substantially the entire length of said connecting rod, and wherein said housing portion serves as a handle for the operator to manipulate the tool.

17. The combination of claim 16, wherein said cutter means comprise a cutting edge formed on the side thereof facing said rotary power shaft, whereby an operator uses said tool to cut by pulling said tool towards himself.

18. The combination of claim 16, said housing comprising a crankcase portion integrally joined to said connecting rod portion, a removable cover for said crankcase housing portion, whereby said buttons are held in their openings by the sliding contact of said buttons with said connecting rod, wherein used Teflon button can be removed and replaced by first removing the cutter means, then removing the motor and crankcase cover, sliding out the connecting rod at the crankcase end of the tool, and manually replacing the worn buttons with new buttons from said one end of the tool.

19. The combination of claim 1, wherein said housing means and said connecting rod are made substantially entirely of aluminum.

20. A power driven cutting tool for use with a motor means, said tool comprising a housing for a portion of said motor means, a connecting rod, cutter means attached to one end of said connecting rod, eccentric drive means drivingly connecting said motor means to the opposite end of said connecting rod, said housing including a portion enclosing portions of said connecting rod, said connecting rod and the housing portion surrounding said connecting rod having an extended axial length and being substantially coextensive with each other, and friction bearing means removably mounted in said connecting rod housing at the end thereof remote from said eccentric drive means; whereby said cutter means at said one end of said connecting rod is driven in an axially reciprocatory motion while the transverse motion imparted to said connecting rod by said eccentric drive is substantially entirely absorbed by said friction bearing means; said friction bearing means comprising the sole bearing support of said connecting rod carrying said cutter means, and said connecting rod and said cutter means attached thereto comprising the sole moving part of said power driven tool driven by said motor means.

21. The combination of claim 20, wherein said drive engaging means transforms the rotational speed of said power shaft into a stroke speed of said cutter means at a 1:1 ratio.

22. The combination of claim 20, wherein said motor means rotates and the cutter means strokes at a speed in the range of about 2000 to about 5000 revolutions and strokes per minute, respectively.

23. The combination of claim 20, wherein said rotation speed and said stroke speed is in the range of 2500 to 2600.

24. The combination of claim 20, wherein said bearing means comprises a plurality of Teflon buttons fitted into retaining openings formed in the juxtapositioned portion of said housing means, whereby said buttons are held in their openings by the sliding contact of said buttons with said connecting rod.

25. The combination of claim 20, wherein said motor means is a hydraulic motor.

26. The combination of claim 20, wherein said connecting rod housing portion extends over substantially the entire length of said connecting rod, and wherein said housing portion serves as a handle for the operator to manipulate the tool.

27. The combination of claim 26, said housing comprising a crankcase portion integrally joined to said connecting rod portion, a removable cover for said crankcase housing portion, whereby said buttons are held in their openings by the sliding contact of said buttons with said connecting rod, wherein used Teflon buttons can be removed and replaced by first removing the cutter means, then removing the motor and the crankcase cover, sliding out the connecting rod at the crankcase end of the tool, and manually replacing the worn buttons with new buttons from said one end of the tool.

28. The combination of claim 25, wherein said cutter means comprise a cutting edge formed on the side thereof facing said motor means, whereby an operator uses said tool to cut by pulling said tool towards himself.

* * * * *